Sept. 4, 1923. 1,466,812
J. WENTZ
DEMOUNTABLE WHEEL RIM
Filed April 21, 1921.
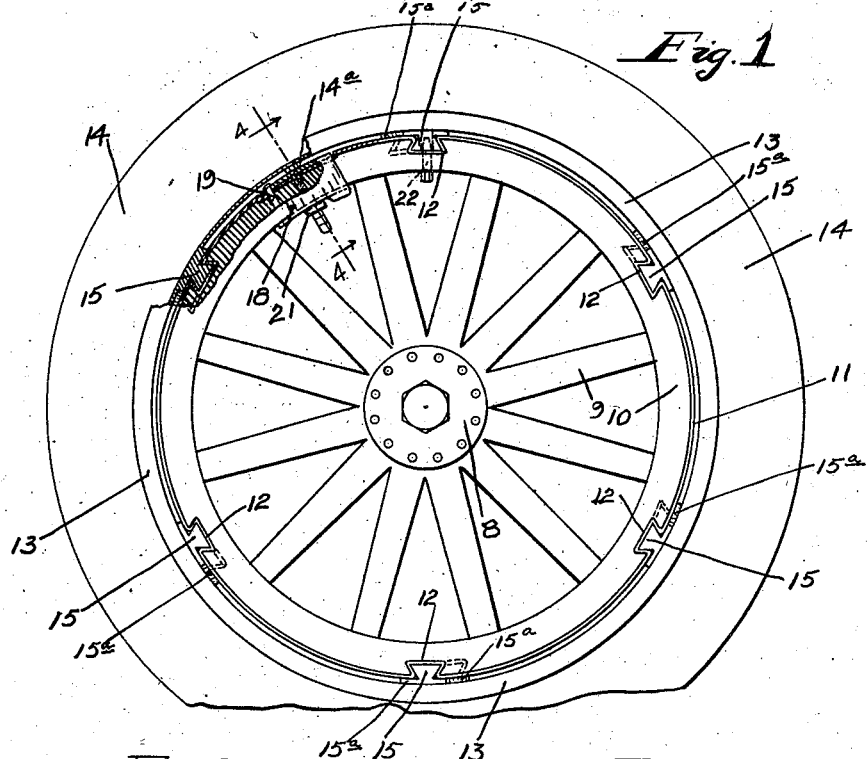
Fig. 1
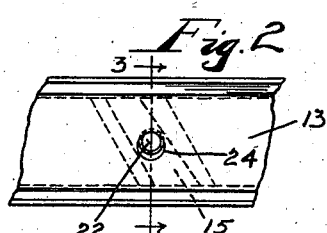
Fig. 2
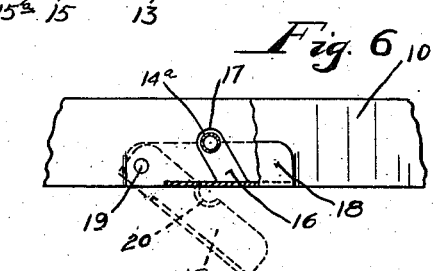
Fig. 6
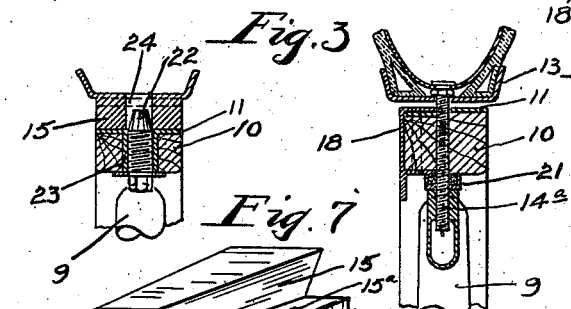
Fig. 3   Fig. 4   Fig. 5
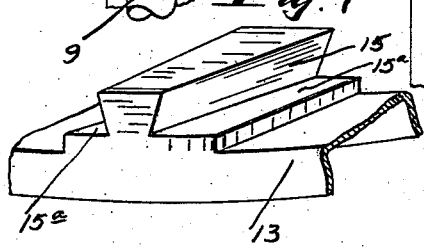
Fig. 7
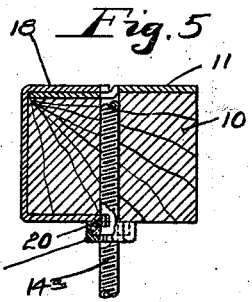
Inventor
John Wentz
By his Attorneys Patented Sept. 4, 1923.

1,466,812

UNITED STATES PATENT OFFICE.

JOHN WENTZ, OF PERHAM, MINNESOTA, ASSIGNOR OF ONE-HALF TO MICHAEL J. GANS AND ONE-FOURTH TO P. F. VOGEL, BOTH OF PERHAM, MINNESOTA.

DEMOUNTABLE WHEEL RIM.

Application filed April 21, 1921. Serial No. 463,222.

*To all whom it may concern:*

Be it known that I, JOHN WENTZ, a citizen of the United States, residing at Perham, in the county of Ottertail and State of Minnesota, have invented certain new and useful Improvements in Demountable Wheel Rims; and I do hereby declare the following to be a full, clear, and exact description of the invention, such as will enable others skilled in the art to which it appertains to make and use the same.

My invention has for its object to provide an extremely simple and highly efficient demountable wheel rim for automobiles and other motor-propelled vehicles, and, generally stated, the same consists of the novel devices and combinations of devices hereinafter described and defined in the claims.

In the accompanying drawings, which illustrate the invention, like characters indicate like parts throughout the several views.

Referring to the drawings:

Fig. 1 is a side elevation with some parts broken away, illustrating my improved rim applied to a wheel;

Fig. 2 is a fragmentary view looking at the outer face of the wheel rim;

Fig. 3 is a section on the line 3—3 of Fig. 2;

Fig. 4 is a section on the line 4—4 of Fig. 1;

Fig. 5 is an enlarged section of certain of the parts shown in Fig. 3, other parts being removed;

Fig. 6 is a fragmentary view looking downward at a portion of the wheel felly and tire found in the vicinity of the section line 4—4 of Fig. 1; and Fig. 7 is a fragmentary view looking at the inner surface of a fragment or part of the demountable rim.

Of the parts of the wheel proper, the numeral 8 indicates the hub, the numeral 9 the spokes, the numeral 10 the felly and the numeral 11 the metal felly band. This felly band 11 at points circumferentially spaced around the wheel, is formed with inwardly bent transversely oblique dove-tailed seats 12 that tightly fit correspondingly formed seats in the felly 10. This is the construction that would be employed when the wheel felly 10 is a wooden structure, but in other wheels, the felly and felly band with the oblique dove-tailed seats might be an integral or otherwise formed metal structure. Preferably, the oblique dovetailed seats 12 are tapered from the outer side toward the inner side of the wheel, for a purpose which will presently appear.

The demountable rim 13, which holds the pneumatic tire 14, is a metal structure made preferably of slightly larger internal diameter than the external diameter of the felly band 11, and on its inner face, it is provided with inwardly projecting oblique dove-tailed flanges 15 that fit the corresponding dovetailed seats 12 of the felly band and, hence, are preferably also slightly tapered in a direction from the outer side toward the inner side of the wheel. As preferably constructed, the dove-tailed flanges 15 are formed with expanded bases $15^a$, welded or otherwise rigidly secured to the demountable rim 13 and arranged to space the latter slightly from the felly band 11, as shown in Fig. 1.

The tire 14 has the customary threaded valve stem $14^a$ and, hence, to arrange for the application of the demountable rim, the wheel felly 10 and felly band 11 are formed with an open notch 16 adjacent to its valve stem seat 17. This notch affords a lateral entrance passage and exit passage for the valve stem and extends parallel to the oblique seats 12.

The notch or passage 16, of course, somewhat weakens the wheel felly and, hence, to reinforce the felly across this gap, a bridge bar 18, preferably in the form of a metal channel, is pivoted at 19 to the wheel felly and felly band and is arranged to embrace the same when turned to the position indicated by full lines in Fig. 6, but to open the notch or passage 16, when turned outward, as shown by dotted lines in Fig. 6.

The bridge bar 18, at the central portion of its inner side, is formed with a semi-circular lock flange 20, which, when the bridge bar is closed, lies close to the valve stem $14^a$ and is adapted to be engaged and held within the flange of a concave lock nut 21 that works with threaded engagement on the valve stem. Thus, the bridge bar will be securely locked in a closed position where it embraces the felly and reinforces the same across the notch or entrance passage 15.

The nut 21 applied as described, in a sense, affords a lock for holding the demountable rim in position on the wheel, but as this would probably throw too much strain on the valve stem, I preferably provide an additional locking device shown in Figs. 1, 2 and 3. This device comprises a cone-pointed set screw 22, which, as shown, works with threaded engagement in a bushing 23 passed radially through the wheel felly. The conical point of this set screw is arranged to engage a perforation 24 formed in one of the dove-tailed lock flanges 15 of the demountable rim.

Obviously, when the set screw is screwed into the hole 24, as best shown in Fig. 3, the demountable rim cannot move circumferentially on the wheel felly and, hence, cannot be removed therefrom or become loose thereon.

When the demountable rim is to be removed, the bridge bar must be turned into its dotted line position, Fig. 6, and the set screw 22 must be turned out of the hole 24 and then the demountable rim may be removed by a sort of a combined backward rotary and lateral movement or, in other words, by a spiral movement such as will carry the dove-tailed lock flanges 15 out of the dove-tailed seats 12. Obviously, the demountable rim must be applied by reverse spiral movement, which causes the dove-tailed flanges 15 to enter the seats 12 as far as their tapered engagement will permit them to go, and when the rim is then locked by the set screw or lock screw 22, there will be absolutely no play between the rim and wheel and the rim will be securely locked to the wheel. Obviously, this rim may be quickly applied to the wheel and quickly removed therefrom.

What I claim is:

1. The combination with a wheel, of a demountable rim, the wheel felly having a lateral entrance passage for the valve stem of a tire applied to said rim, and a channel-shaped bridge bar pivotally connected to the wheel felly and arranged to embrace the inner and outer surfaces of said felly and extend across the gap formed by said entrance passage.

2. The combination with a wheel and a tire-equipped demountable rim, said tire having a valve stem projecting radially inward through said rim, said felly having an oblique lateral entrance passage for said valve stem, and a bridge bar pivoted to the wheel felly and applied across the gap formed by said lateral entrance passage, said bridge bar having a lock flange adjacent to the valve stem, and a nut on the valve stem engaging the flange on said bridge bar and locking the same in position and against pivotal movement.

In testimony whereof I affix my signature.

JOHN WENTZ.